(12) United States Patent
Nabert et al.

(10) Patent No.: US 6,994,237 B2
(45) Date of Patent: Feb. 7, 2006

(54) INTERIOR DESIGN DEVICE FOR A VEHICLE, ESPECIALLY A MOTOR VEHICLE

(75) Inventors: Bernd Nabert, Schopfloch (DE);
Erwin Lutz, Schwieberdingen (DE);
Frank Diehm, Kircheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 48 days.

(21) Appl. No.: 10/689,542

(22) Filed: Oct. 21, 2003

(65) Prior Publication Data

US 2004/0134948 A1    Jul. 15, 2004

Related U.S. Application Data

(63) Continuation of application No. PCT/EP02/03705, filed on Apr. 4, 2002.

(30) Foreign Application Priority Data

Apr. 21, 2001    (DE)    ............................. 101 19 604

(51) Int. Cl.
*B60R 7/10*    (2006.01)
(52) U.S. Cl. .................... 224/313; 224/311; 224/927; 296/214
(58) Field of Classification Search ............... 224/311, 224/313, 268, 927; 296/214, 97.9
See application file for complete search history.

(56) References Cited

U.S. PATENT DOCUMENTS

| 3,845,890 | A | | 11/1974 | Johns | |
| 4,720,028 | A | * | 1/1988 | Takemura et al. | 224/553 |
| 4,981,323 | A | * | 1/1991 | Dowd et al. | 296/214 |
| 5,411,233 | A | * | 5/1995 | Grimes et al. | 248/305 |
| 5,492,260 | A | * | 2/1996 | Rieden et al. | 224/553 |
| 5,507,423 | A | * | 4/1996 | Fischer et al. | 224/313 |
| 6,095,469 | A | * | 8/2000 | Von Alman | 248/304 |
| 6,397,435 | B1 | * | 6/2002 | Gosselet | 16/438 |

FOREIGN PATENT DOCUMENTS

| DE | 4135300 A1 | 4/1993 |
| DE | 4333479 A1 | 4/1994 |
| JP | 2001-171438 | 6/2001 |

* cited by examiner

*Primary Examiner*—Stephen K. Cronin
(74) *Attorney, Agent, or Firm*—Crowell & Moring LLP

(57) ABSTRACT

An interior design device for motor vehicles is provided which can be installed in an interior space of the vehicle with a lining section that can be fastened to a vehicle wall. A fastening section for the lining section and a coat hook element extend into the interior. The fastening section and the hook element are connected with each other via a bridge and the fastening section can be attached to the vehicle wall and the hook element rests against the interior surface of the lining section facing the interior. In order to be able to fasten the lining section of the interior design device in a simple manner, the fastening section is installed between the lining section and the vehicle wall with the bridge extending beyond a peripheral edge of the lining section and the fastening section and the hook element are placed on top of the peripheral edge.

28 Claims, 2 Drawing Sheets

INTERIOR DESIGN DEVICE FOR A VEHICLE, ESPECIALLY A MOTOR VEHICLE

This application is a continuation of International Patent Application No. PCT/EP02/03705 filed on Apr. 4, 2002, designating the United States of American, the entire disclosure of which is incorporated herein by reference. Priority is claimed based on Federal Republic of Germany Patent Application No. DE 101 19 604.0 filed Apr. 4, 2001.

BACKGROUND AND SUMMARY OF THE INVENTION

The invention concerns an interior design device for a vehicle, especially a motor vehicle, which can be installed in the interior of the vehicle, with a lining section that can be fastened to a vehicle wall, a fastening section for the lining section and with a hook element protruding into the interior, especially a coat hook, wherein the fastening section and the hook element are connected with each other via a bridge, the fastening section can be attached to the vehicle wall and the hook element rests against an interior surface of the lining section facing the interior.

German Patent Document No. DE 43 33 479 A1 describes a generic interior design device for a vehicle. This interior design device contains a lining section that is attached to a vehicle wall and a fastening section for the lining section, wherein this fastening section is designed like a barb and reaches behind the vehicle wall. Furthermore, this interior design device contains a hook element, especially a clothes hook, which protrudes into the interior of the vehicle. The fastening section and the hook element are connected to each other via a bridge. Additionally, the fastening section serves the purpose of fastening both the lining section and the hook element. The disadvantage is that the lining section rests directly against the vehicle wall.

It is therefore a task of the invention to create an interior design device of the kind described above for a vehicle, whose lining section can be fastened to the vehicle wall at a distance in a simple manner.

This task is accomplished with an interior design device for a vehicle, especially a motor vehicle, which can be installed in the interior of the vehicle, with a lining section that can be fastened to a vehicle wall, a fastening section for the lining section and with a hook element protruding into the interior, especially a coat hook, wherein the fastening section and the hook element are connected with each other via a bridge, the fastening section can be attached to the vehicle wall and the hook element rests against an interior surface of the lining section facing the interior, wherein the fastening section is configured to be installed between the lining section and the vehicle wall, wherein the bridge extends beyond a peripheral edge of the lining section, and wherein the fastening section and the hook element are placed on top of the peripheral edge.

Major advantages accomplished with the invention are that a lining section of an interior design device for a motor vehicle can be fastened to the vehicle wall at a distance to it with just a few assembly steps.

Additionally, according to certain preferred embodiments of the invention, a hook element of the interior design device is attached to the vehicle wall by the fastening section. A vehicle design device can be installed between the lining section and the vehicle wall. When the lining section is attached to the B or the C column of the vehicle body, for example, a safety belt device or another safety element, especially a fastening element, can be installed as the vehicle design device behind the lining section.

The invention is explained in more detail in the following based on examples while referencing the drawing.

Other objects, advantages and novel features of the present invention will become apparent from the following detailed description of the invention when considered in conjunction with the accompanying drawings.

DETAILED DESCRIPTION OF THE DRAWINGS

Figure 1:
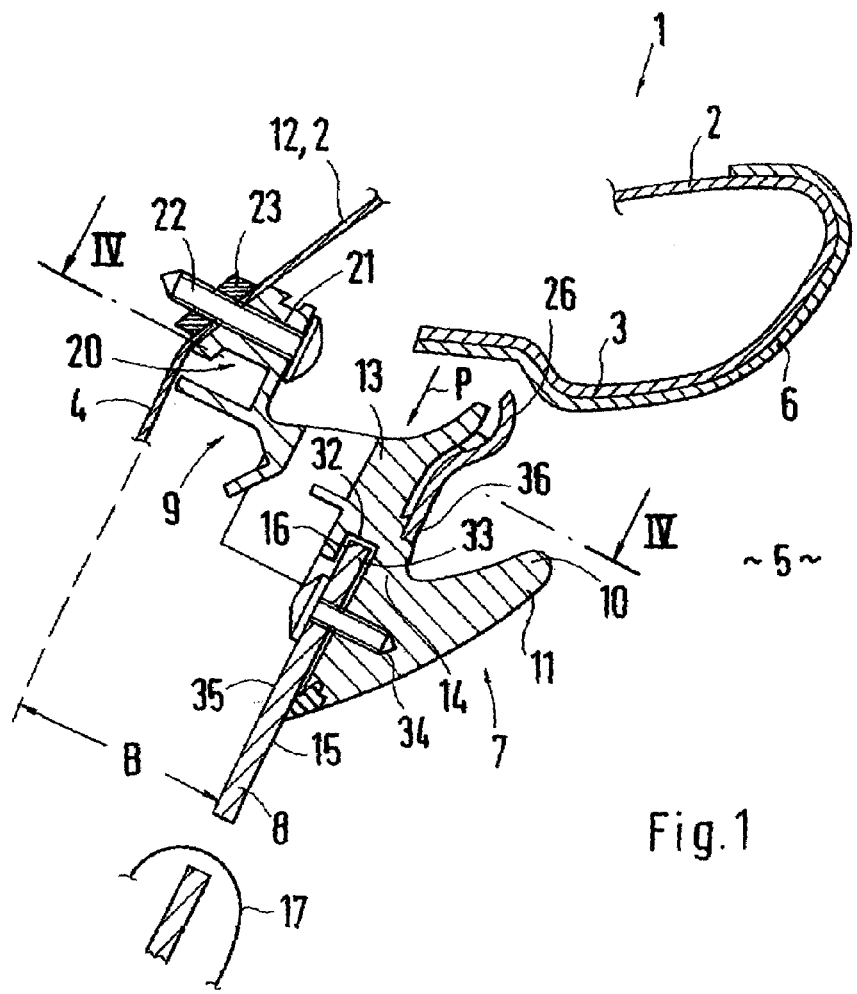
FIG. 1 is a sectional schematic view of the interior of a vehicle with an interior design device depicted in a sectional view, constructed according to a preferred embodiment of the present invention.

FIG. 1 shows a section of vehicle 1, especially a motor vehicle, for example a passenger car, wherein from the vehicle 1 only parts of the vehicle construction 2 are shown in a cross-sectional view. Especially visible from construction 2 is a longitudinal roof cross-beam 3 and a B-column 4. The longitudinal roof cross-beam 3 can be lined with a cover 6 on a surface visible from the interior 5 of the vehicle.

Another longitudinal roof cross-beam (not shown) is located opposite the longitudinal roof cross-beam 3. A roof opening can be incorporated between the two longitudinal roof cross-beams, which can be released or closed by a removable or displaceable cover. The longitudinal roof cross-beams can be a section of the body of the vehicle 1 or a roof module that can be inserted in the body that supports the cover.

An interior design device 7 is installed or can be installed in the interior 5 of the vehicle 1. It comprises at least one, preferably dimensionally stable, lining section 8, a fastening section 9 for the lining section and a hook element 10 protruding into the interior 5, which can contain a clothing hook 11 or can form this clothing hook 11. The lining section 8 is attached with the fastening section 9 to a vehicle wall 12, which is assumed to be a B-column 4 purely for illustration purposes. It is also possible, however, to fasten the lining section 8 to other vehicle interior walls, such as the A- or C-column, the roof or the like.

The fastening section 9 and the hook element 10 are connected to each other via a bridge 13. The bridge 13, fastening section 9, and hook element 10 can be designed as a single piece, preferably a molded component. A base plate 14 of the hook element 10 rests against an interior surface 15 of the lining section 8 facing the interior 5. The fastening section 9 is installed between the lining section 8 and the vehicle wall 12 so that the lining section 8 is installed at a distance to the vehicle wall 12. The fastening section 9 with the hook element 10 is placed onto an edge 16 of the lining section 8, wherein this edge 16 in the example is the upper edge, which is installed adjacent to the longitudinal roof cross-beam 3. The bridge 13 reaches across this edge 16 by placing the fastening section 9 and the hook element 10 on top in the direction of the arrow P. Since the hook element 10 rests against the interior surface 15 of the lining section 8, the lining section 8 is fastened simultaneously when attaching the fastening section 9 to the vehicle wall 12. Due to the width B of the fastening section 9, the lining section 8 is installed at a distance to the vehicle wall 12, thus creating space for a vehicle design device. In the example shown, it consists of a safety belt device, whose belt 17 is guided behind the lining section 8.

Figure 2:
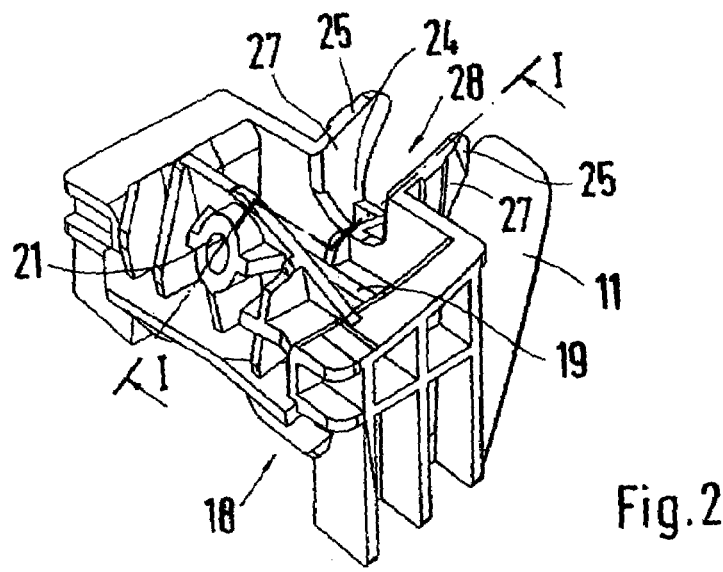
FIG. 2 is a perspective view of a fastening element of the interior design device pursuant to FIG. 1.
Figure 3:
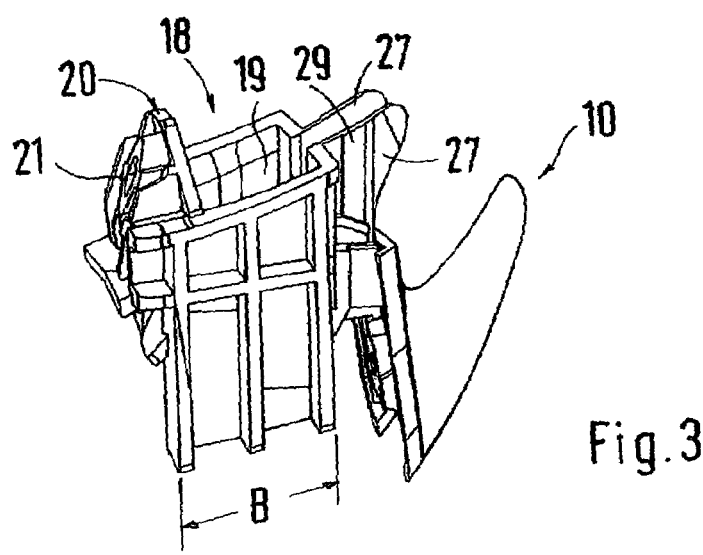
FIG. 3 is another perspective view of a fastening element of the interior design device pursuant to FIG. 1.

Based on FIGS. 2 and 3, the fastening section 9 is described in more detail. It can be formed by a cuboid block 18 with the width B, which is preferably hollow, i.e., contains at least one inner recess 19. A wall area 20, which runs roughly parallel to the vehicle wall 12, protrudes beyond the outer contour of the block 18, wherein said wall area contains an opening 21, through which a first connecting means 22 (FIG. 1) extends, which is attached to the vehicle wall 12, preferably in a receptacle device 23, which can be fastened to or incorporated on the vehicle wall 12. The first connecting means 22 is preferably a screw, which is screwed into the receptacle device 23. In order to be able to insert the first connecting means 22 from the interior 5, a recess 24 is provided in front of the opening 21 in the block 18 or bridge 13, which is flush with the opening 21.

Figure 4:
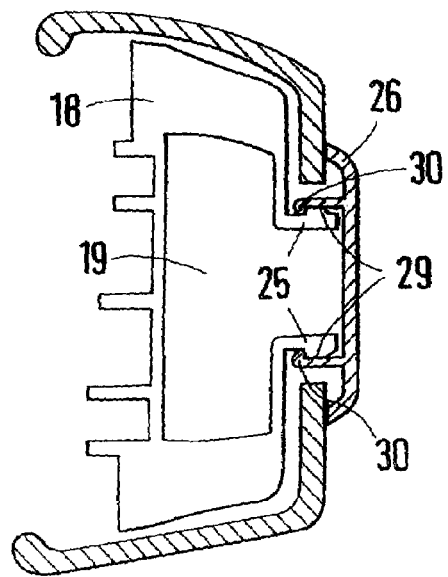
FIG. 4 is a sectional view of the interior design device, taken along the line IV—IV in FIG. 1.
Figure 5:
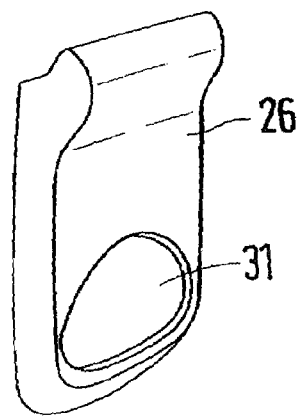
FIG. 5 is a perspective view of a screen of the interior design device pursuant to FIG. 1.

From the edge area of the recess 24 a fastening device 25 for a screen 26 extends, which covers at least the recess 24 and/or the connecting means 22. The fastening device 25 can extend from the bridge 13, the fastening section 9 or the hook element 10. The screen 26 can reach all the way to the cover 6 of the longitudinal roof cross-beam 3. The fastening device 25 preferably comprises two extensions 27, which originate at the edge area of the recess 24, point in the direction of the vehicle interior 5 and extend away from the edge 16. The two extensions 27 are installed at a distance to each other and thus form the through-space 28, in which the recess 24 is also located. Above the through-space an actuating tool can thus be guided to the first connecting means 22. A snap-fit protrusion 29 is designed in each extension 27, behind which a snap-fit extension 30 engages that is provided on the screen 26, as is especially depicted in FIG. 4, which also shows that the cross-section of the lining section 8 can have a C-shape. FIG. 1 and FIG. 5 show that the screen 26 covers the base plate 14 of the hook element 10. The coat hook 11 protrudes into the interior 5 through a perforation 31 on the screen 26.

A receiving recess 32 can be incorporated into the bridge 13, in which the edge area 33, which is located behind the edge 16 of the lining section 8, is seated. The fastening section 9 and the hook element 10 are installed at a distance to each other so that the edge area 33 is seated in between, for which a snap-fit or clamping connection can be provided, in order to enable sub-assembly by placing the fastening section 9 and the hook element 10 onto the lining section 8. For sub-assembly and/or for safe fastening of the lining section 8, a second connecting means 34 can be inserted between the lining section 8 and the hook element 10, wherein said means preferably penetrates the lining section 8 and is attached to the base plate 14 of the hook element 10. The second connecting means 34 can connect the lining section 8 with the base plate 14 from an exterior surface 35 of the lining section 8, which in the case of an interior design device 7 that is installed in the vehicle, faces away from the interior 5. The second connecting means 34 is inserted before the lining section 8 is fastened to the vehicle wall 12. Since the second connecting means 34 is screwed in from the exterior 35, it would be feasible to design the screen 26 such that it extends only to the upper edge 36 of the base plate 14 and thus covers only the intermediate space 28, the recess 24 and the first connecting means 22.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. Interior design device for a vehicle, especially a motor vehicle having a vehicle wall, which can be installed in the interior of the vehicle, with a lining section, a fastening section for attaching the lining section to the vehicle wall, and a hook element protruding into the interior, especially a coat hook, wherein the fastening section and the hook element are connected with each other via a bridge, wherein the fastening section can be attached to the vehicle wall with the hook element resting against an interior surface of the lining section facing the interior, wherein the fastening section is configured to be installed between the lining section and the vehicle wall, wherein the bridge extends beyond a peripheral edge of the lining section, wherein the fastening section and the hook element are placed on top of the peripheral edge, wherein the fastening section contains an opening through which a first connector extends, which first connector holds the fastening section against the vehicle wall, wherein a screen is provided which covers at least the first connector, wherein this screen is attached via a fastening device, preferably in a snap-fit fashion, to the fastening section or the hook element or the bridge, wherein the fastening section comprises at least one extension extending in a direction of the interior, and wherein a snap-fit protrusion is incorporated on said extension behind which a snap-fit extension provided on the screen engages.

2. Interior design device pursuant to claim 1, wherein the bridge, the hook element and the fastening section are produced as one piece.

3. Interior design device pursuant to claim 1, wherein the hook element comprises a base plate which rests against the interior surface of the lining section and supports a hook.

4. Interior design device pursuant to claim 3, wherein the bridge, the hook element and the fastening section are produced as one piece.

5. Interior design device pursuant to claim 3, wherein the screen covers the base plate and contains a perforation for the hook.

6. Interior design device pursuant to claim 5, wherein the lining section and the base plate are connected to each other by a second connector.

7. Interior design device pursuant to claim 6, wherein the second connector extends through the lining section from an exterior surface of the lining section facing away from the interior and is attached to the base plate.

8. Interior design device pursuant to claim 1, wherein two of said extensions are provided that are installed at a distance from each other and thus form a through-space for an actuating tool for the first connector, and wherein an opening for the first connector is installed behind the through-space.

9. Interior design device pursuant to claim 8, wherein the fastening section is designed as a cuboid hollow block, beyond which—protruding its contour—the extension(s) and a wall area containing the opening for the first connector protrude.

10. Interior design device pursuant to claim 8, wherein the bridge, the hook element and the fastening section are produced as one piece.

11. Interior design device pursuant to claim 8, wherein the hook element comprises a base plate which rests against the interior surface of the lining section and supports a hook.

12. Interior design device pursuant to claim 11, wherein the fastening section is designed as a cuboid hollow block, beyond which—protruding its contour—the extension(s) and a wall area containing the opening for the first connector protrude.

13. Interior design device pursuant to claim 11, wherein the screen covers the base plate and contains a perforation for the hook.

14. Interior design device pursuant to claim 13, wherein the fastening section is designed as a cuboid hollow block, beyond which—protruding its contour—the extension(s) and a wall area containing the opening for the first connector protrude.

15. Interior design device pursuant to claim 13, wherein the lining section and the base plate are connected to each other by a second connector.

16. Interior design device pursuant to claim 15, wherein the second connector extends through the lining section from an exterior surface of the lining section facing away from the interior and is attached to the base plate.

17. Interior design device pursuant to claim 16, wherein the bridge, the hook element and the fastening section are produced as one piece.

18. Interior design device pursuant to claim 16, wherein the screen covers the base plate and contains a perforation for the hook.

19. Interior design device pursuant to claim 18, wherein the lining section and the base plate are connected to each other by a second connector.

20. Interior design device pursuant to claim 19, wherein the second connector extends through the lining section from an exterior surface of the lining section facing away from the interior and is attached to the base plate.

21. Interior design device for a vehicle, especially a motor vehicle having a vehicle wall, which can be installed in the interior of the vehicle, with a lining section, a fastening section for attaching the lining section to the vehicle wall, and a hook element protruding into the interior, especially a coat hook,
 wherein the fastening section and the hook element are connected with each other via a bridge,
 wherein the fastening section can be attached to the vehicle wall with the hook element resting against an interior surface of the lining section facing the interior,
 wherein the fastening section is configured to be installed between the lining section and the vehicle wall, wherein the bridge extends beyond a peripheral edge of the lining section, and
 wherein the hook element comprises a base plate which rests against the interior surface of the lining section and supports a hook.

22. Interior design device pursuant to claim 21, wherein the bridge, the hook element and the fastening section are produced as one piece.

23. Interior design device pursuant to claim 21, wherein the lining section and the base plate are connected to each other by a second connector.

24. Interior design device pursuant to claim 23, wherein the second connector extends through the lining section from an exterior surface of the lining section facing away from the interior and is attached to the base plate.

25. Interior design device pursuant to claim 21, wherein the fastening section contains an opening through which a first connector extends, which first connector holds the fastening section against the vehicle wall.

26. Interior design device pursuant to claim 25, wherein a screen is provided which covers at least the first connector,
 wherein this screen is attached via a fastening device, preferably in a snap-fit position, to the fastening section or the hook element or the bridge.

27. Interior design device for a vehicle, especially a motor vehicle having a vehicle wall, which can be installed in the interior of the vehicle, with a lining section, a fastening section for attaching the lining section to the vehicle wall, and a hook element protruding into the interior, especially a coat hook,
 wherein the fastening section and the hook element are connected with each other via a bridge,
 wherein the fastening section can be attached to the vehicle wall and the hook element rests against an interior surface of the lining section facing the interior,
 wherein the fastening section is configured to be installed between the lining section and the vehicle wall, wherein the bridge extends beyond a peripheral edge of the lining section,
 wherein the fastening section and the hook element are placed on top of the peripheral edge,
 wherein a screen is provided which covers at least the first connector,
 wherein this screen is attached via a fastening device, preferably in a snap-fit fashion, to the fastening section or the hook element or the bridge, and
 wherein the bridge, the hook element and the fastening section are produced as one piece.

28. An assembly comprising:
 an exterior vehicle body wall,
 a lining spaced from the body wall and facing a vehicle interior passenger space,
 a one piece member containing a clothes hook element which in use protrudes into the passenger space and a fastening section for fastening the one piece member to the vehicle wall and lining while maintaining said lining spaced from the vehicle wall, said fastening section being engageable from above over the top edge of said lining,
 wherein the fastening section contains an opening through which a first connector extends, which first connector holds the fastening section against the vehicle wall,
 wherein a screen is provided which covers at least the first connector, and
 wherein this screen is attached via a fastening device, preferably in a snap-fit fashion, to the fastening section or the hook element or a bridge connecting the fastening section with the a lock element.

* * * * *